US012636223B2

(12) United States Patent
Jin

(10) Patent No.: US 12,636,223 B2
(45) Date of Patent: May 26, 2026

(54) MALE MASSAGER WITH TELESCOPIC ROTATING STRUCTURE

(71) Applicant: Feng Jin, Huizhou (CN)

(72) Inventor: Feng Jin, Huizhou (CN)

( * ) Notice: Subject to any disclaimer, the term of this patent is extended or adjusted under 35 U.S.C. 154(b) by 505 days.

(21) Appl. No.: 18/457,408

(22) Filed: Aug. 29, 2023

(65) Prior Publication Data

US 2025/0073116 A1 Mar. 6, 2025

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0153* (2013.01)

(58) Field of Classification Search
CPC ................ A61H 19/32; A61H 23/0254; A61H 2201/0153; A61H 2201/1215; A61H 2201/149; A61H 2201/1664
See application file for complete search history.

(56) References Cited

U.S. PATENT DOCUMENTS 6,632,185 B2 * 10/2003 Chen .................. A61H 15/0085 600/38
6,902,525 B1 * 6/2005 Jewell .................... A61H 19/44 600/38
2004/0082831 A1 * 4/2004 Kobashikawa ........ A61H 19/32 600/38
2009/0099413 A1 * 4/2009 Kobashikawa ........ A61H 19/44 600/38
2010/0152631 A1 * 6/2010 Knyrim .............. A61H 23/0254 601/89
2016/0008218 A1 * 1/2016 Murison ................ A61H 19/44 601/46

* cited by examiner

*Primary Examiner* — Bo Joseph Peng
(74) *Attorney, Agent, or Firm* — JEEN IP LAW, LLC

(57) ABSTRACT

The present disclosure discloses a male massager with a telescopic rotating structure including a telescopic mechanism, a rotating mechanism, a telescopic rotating shaft, and a massage component. The telescopic mechanism independently drives the telescopic rotating shaft to extend and retract, allowing the massage component to perform an independent telescopic motion, thereby activating an independent telescopic motion mode; the rotating mechanism independently drives the telescopic rotating shaft to rotate, allowing the massage component to perform an independent rotational motion, thereby activating an independent rotational motion mode; the telescopic mechanism and the rotating mechanism respectively drive the telescopic rotating shaft to extend-and-retract and rotate, allowing the massage component to perform telescopic and rotational motions simultaneously, thereby activating a composite motion mode with telescopic and rotational motions. The male massager with a telescopic rotating structure of the present disclosure has various functions and can meet diverse needs of a user.

9 Claims, 9 Drawing Sheets

MALE MASSAGER WITH TELESCOPIC ROTATING STRUCTURE

TECHNICAL FIELD

The present disclosure relates to the field of health products technologies, and in particular, to a male massager with a telescopic rotating structure.

BACKGROUND

Health care refers to an effective measure taken to maintain and enhance people's mental and physical health, and it includes prevention of various mental illnesses caused by work, life, environment, etc. or various physical diseases caused by mental factors. Although health care cannot directly improve an individual's mental health level, it can prevent an occurrence of unhealthy psychology and behavior. In a dual factor theory recognized by psychologists, it is believed that an individual's work is influenced by two types of factors: one is the factor that can make people feel satisfied, which can affect their work enthusiasm and inspire them to achieve best results; the second is the health factor, also known as the "maintenance factor", which can only prevent people from feeling dissatisfied and does not have a motivating effect. It is a necessary condition for maintaining people's mental health and not being discouraged, and has a preventive effect, which can maintain people's enthusiasm and maintain the work status quo.

Male massagers are one of the most important products in the healthcare field. Traditional male massagers have a single function and cannot meet the user's needs well.

SUMMARY

The purpose of the present disclosure is to overcome the shortcomings of existing technology and provide a male massager with a telescopic rotating structure, which has diverse functions and can meet various usage needs of a user.

The purpose of the present disclosure is achieved through the following technical solutions:

a male massager with a telescopic rotating structure, including a telescopic mechanism, a rotating mechanism, a telescopic rotating shaft, and a massage component;

where, the telescopic mechanism drives the telescopic rotating shaft to extend and retract, and causes the massage component to perform a telescopic motion;

where, the rotating mechanism drives the telescopic rotating shaft to rotate and causes the massage component to perform a rotation motion;

where, the telescopic mechanism and the rotating mechanism respectively drive the telescopic rotating shaft to extend-and-retract and rotate, so that the massage component performs telescopic and rotational motions simultaneously.

In an embodiment, the telescopic mechanism includes a telescopic drive motor, a telescopic drive component, a slide rail, and a slider;

the slider is provided on the slide rail in a reciprocating sliding manner, and the slider is provided with a sleeve ring, the telescopic rotating shaft is rotatably sleeved on the sleeve ring;

the telescopic drive motor drives the slider to slide back and forth along the slide rail through the telescopic drive component, so that the sleeve ring drives the telescopic rotating shaft to extend and retract.

In an embodiment, the telescopic drive component includes a driving bevel gear and a driven bevel gear that mesh with each other;

the driving bevel gear is drive-connection with an output end of the telescopic drive motor, and the driven bevel gear is provided with an eccentric shaft, the slider is provided with a waist-round hole, and the eccentric shaft is inserted into the waist-round hole.

In an embodiment, the rotating mechanism includes a rotatable drive motor and a rotatable drive rod that is drive-connection with an output end of the rotatable drive motor;

the telescopic rotating shaft can be reciprocally connected to the rotatable drive rod along an axis direction, and the telescopic rotating shaft cannot rotate relative to the rotatable drive rod.

In an embodiment, an outside wall of the rotatable drive rod is provided with a limit rotation convex ridge along the axis direction, and an inner side wall of the telescopic rotating shaft is provided with a limit rotation groove along the axis direction; the rotatable drive rod is inserted into the telescopic rotating shaft, and the limit rotation convex ridge is located in the limit rotation groove.

In an embodiment, the slide rail is provided with a support sleeve, and the telescopic rotating shaft is retractably and rotatably sleeved on the support sleeve.

In an embodiment, the male massager with a telescopic rotating structure further includes a support seat; and the support seat has a motor holding portion and a gear holding portion;

the telescopic drive motor and the rotatable drive motor are installed side by side in the motor holding portion, and an output shaft of the telescopic drive motor and an output shaft of the rotatable drive motor are parallel to each other and located on the same side;

the driving bevel gear and the driven bevel gear are installed in the gear holding portion.

In an embodiment, the male massager with a telescopic rotating structure further includes a control center having a circuit board and a battery.

In an embodiment, the massage component includes an outer frame and an inner liner detachably connected to the outer frame.

In an embodiment, an outside of the telescopic drive motor and an outside of the rotatable drive motor are provided with a wrapping sleeve.

The male massager with a telescopic rotating structure of the present disclosure has various functions and can meet diverse needs of a user.

BRIEF DESCRIPTION OF DRAWINGS

In order to provide a clearer explanation of the technical solution of an embodiment of the present disclosure, a brief introduction will be given to the drawings required in the embodiment. It should be understood that the following drawings only illustrate a certain embodiment of the present disclosure, and therefore should not be regarded as limiting the scope. For ordinary technical personnel in the art, other relevant drawings can also be obtained based on these drawings without creative work.

DETAILED DESCRIPTION

Figure 1:
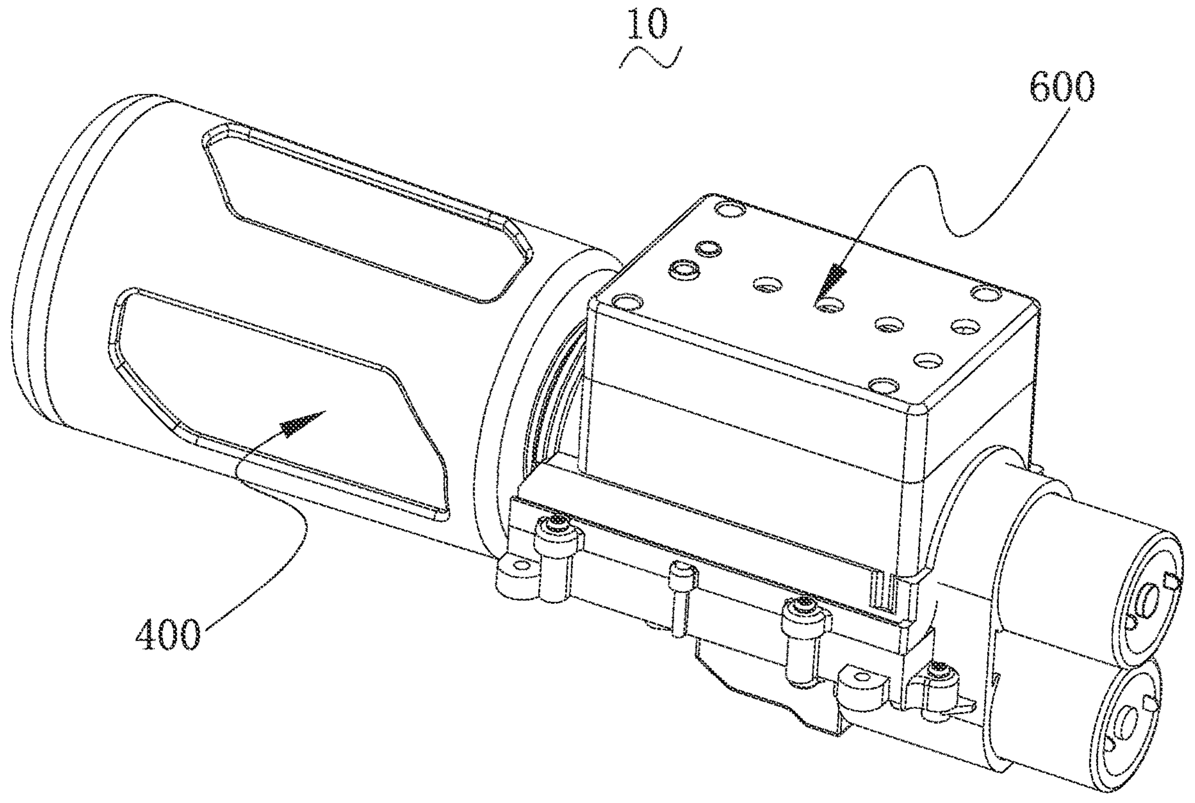
FIG. 1 is a combination diagram of a male massager with a telescopic rotating structure according to an embodiment of the present disclosure.

In order to facilitate the understanding of the present disclosure, a more comprehensive description will be provided below with reference to the relevant drawings. Some embodiments of the present disclosure are shown in the drawings. However, the present disclosure can be implemented in many different forms, not limit to the embodiments described herein. On the contrary, the purpose of providing these embodiments is to provide a more thorough and comprehensive understanding of the disclosed content of the present disclosure.

It should be noted that when a component is referred to as "fixed to" another component, it can be directly attached to another component or there may present a component between herein. When a component is considered to be "connected to" another component, it can be directly connected to another component or there may present a component between herein. The terms "vertical", "horizontal", "left", "right", and similar expressions used in this description are only for an illustrative purpose and do not necessarily represent it is the only implementation method.

Unless otherwise defined, all technical and scientific terms used in this description have the same meanings as those commonly understood by those skilled in the technical field of the present disclosure. The terms used in the specification of the present disclosure in this description is only for a purpose of describing a specific embodiment and are not intended to limit the present disclosure. The term "and/or" used in this description includes any and all combinations of one or more related listed items.

Figure 2:
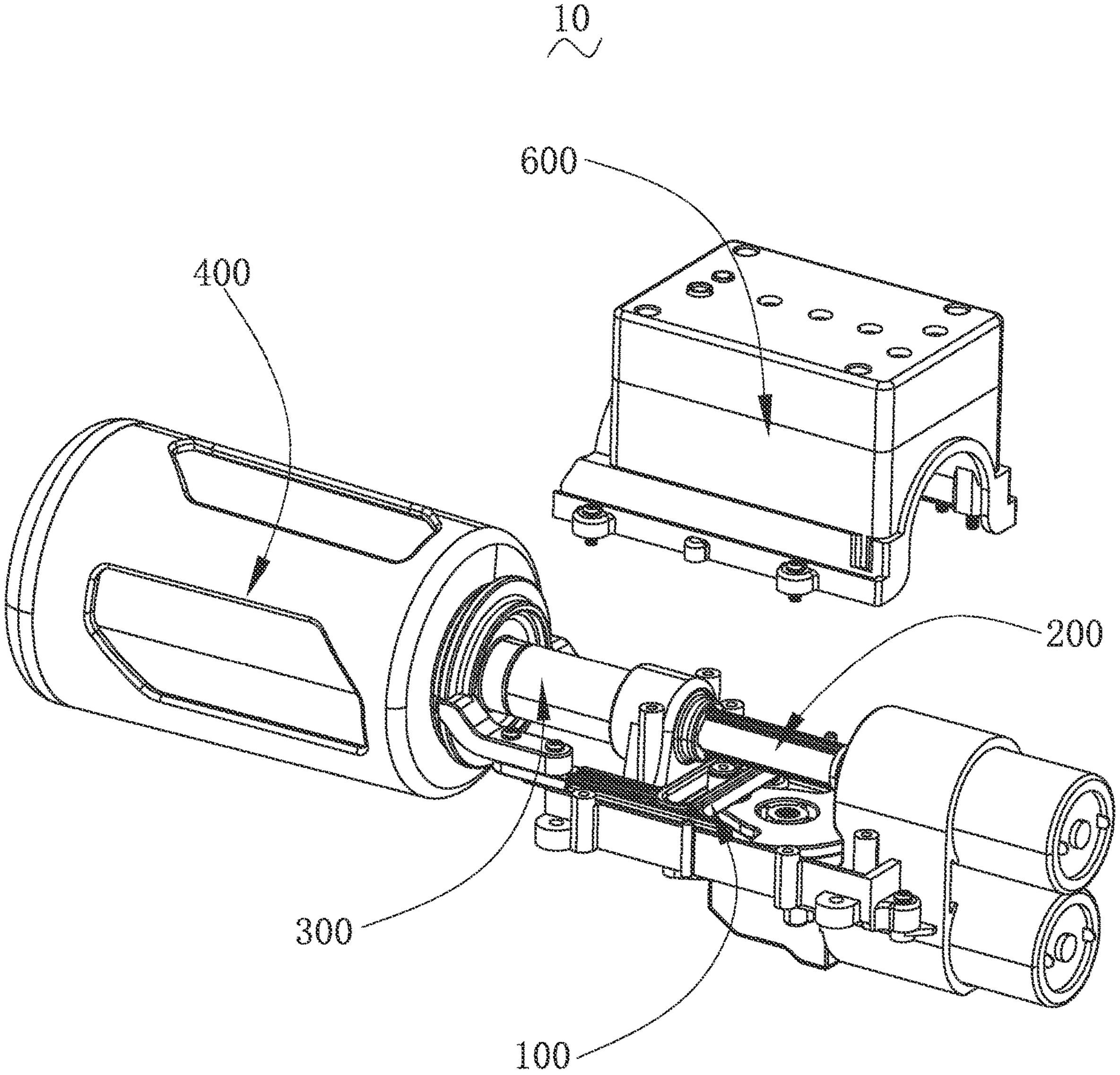
FIG. 2 is a first exploded view of the male massager with a telescopic rotating structure shown in FIG. 1.

As shown in FIGS. 1 and 2, the present disclosure discloses a male massager 10 with a telescopic rotating structure including a telescopic mechanism 100, a rotating mechanism 200, a telescopic rotating shaft 300, and a massage component 400.

The telescopic mechanism 100 drives the telescopic rotating shaft 300 to extend and retract, and causes the massage component 400 to perform a telescopic motion.

The rotating mechanism 200 drives the telescopic rotating shaft 300 to rotate and causes the massage component 400 to perform a rotation motion.

The telescopic mechanism 100 and the rotating mechanism 200 respectively drive the telescopic rotating shaft 300 to extend-and-retract and rotate, so that the massage component 400 can perform telescopic and rotational motions simultaneously.

The male massager 10 with a telescopic rotating structure of the present disclosure has the following characteristics:

- the telescopic mechanism 100 independently drives the telescopic rotating shaft 300 to extend and retract, allowing the massage component 400 to perform an independent telescopic motion, thereby activating an independent telescopic motion mode;
- the rotating mechanism 200 independently drives the telescopic rotating shaft 300 to rotate, allowing the massage component 400 to perform an independent rotational motion, thereby activating an independent rotational motion mode;
- the telescopic mechanism 100 and the rotating mechanism 200 respectively drive the telescopic rotating shaft 300 to extend-and-retract and rotate, so that the massage component 400 can perform telescopic and rotational motions simultaneously, thereby activating a composite motion mode with both telescopic and rotational motions.

Below, a specific structure of the telescopic mechanism 100 will be explained (please refer to FIGS. 3 and 4 together):

- the telescopic mechanism 100 includes a telescopic drive motor 110, a telescopic drive component 120, a slide rail 130, and a slider 140.
- the slider 140 is provided on the slide rail 130 in a reciprocating sliding manner, and the slider 130 is provided with a sleeve ring 141, the telescopic rotating shaft 300 can be rotatably sleeved on the sleeve ring 141;
- the telescopic drive motor 110 drives the slider 140 to slide back and forth along the slide rail 130 through the telescopic drive component 120, so that the sleeve ring 141 drives the telescopic rotating shaft 300 to extend and retract.

Figure 3:
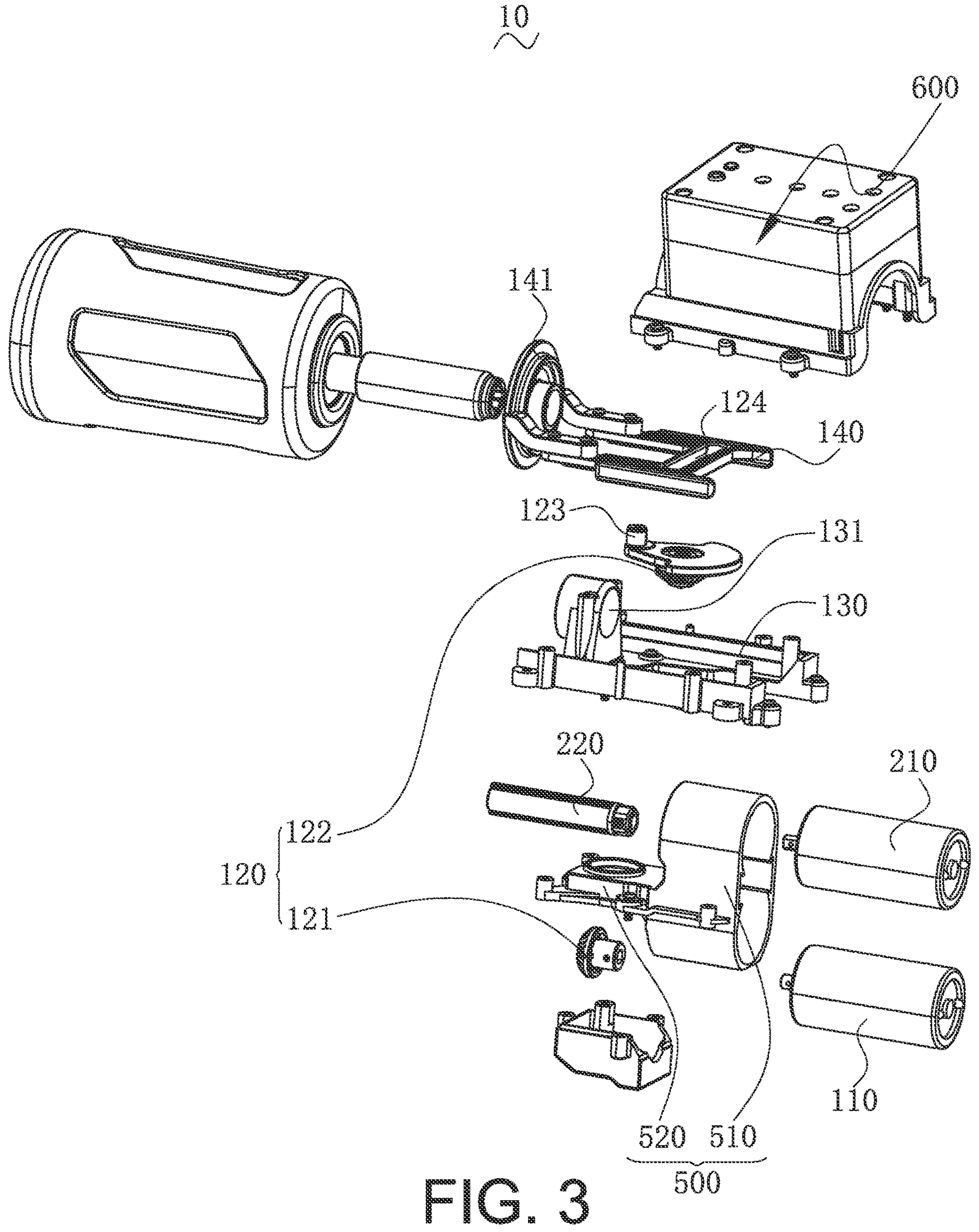
FIG. 3 is a second exploded view of the male massager with a telescopic rotating structure shown in FIG. 1.
Figure 4:
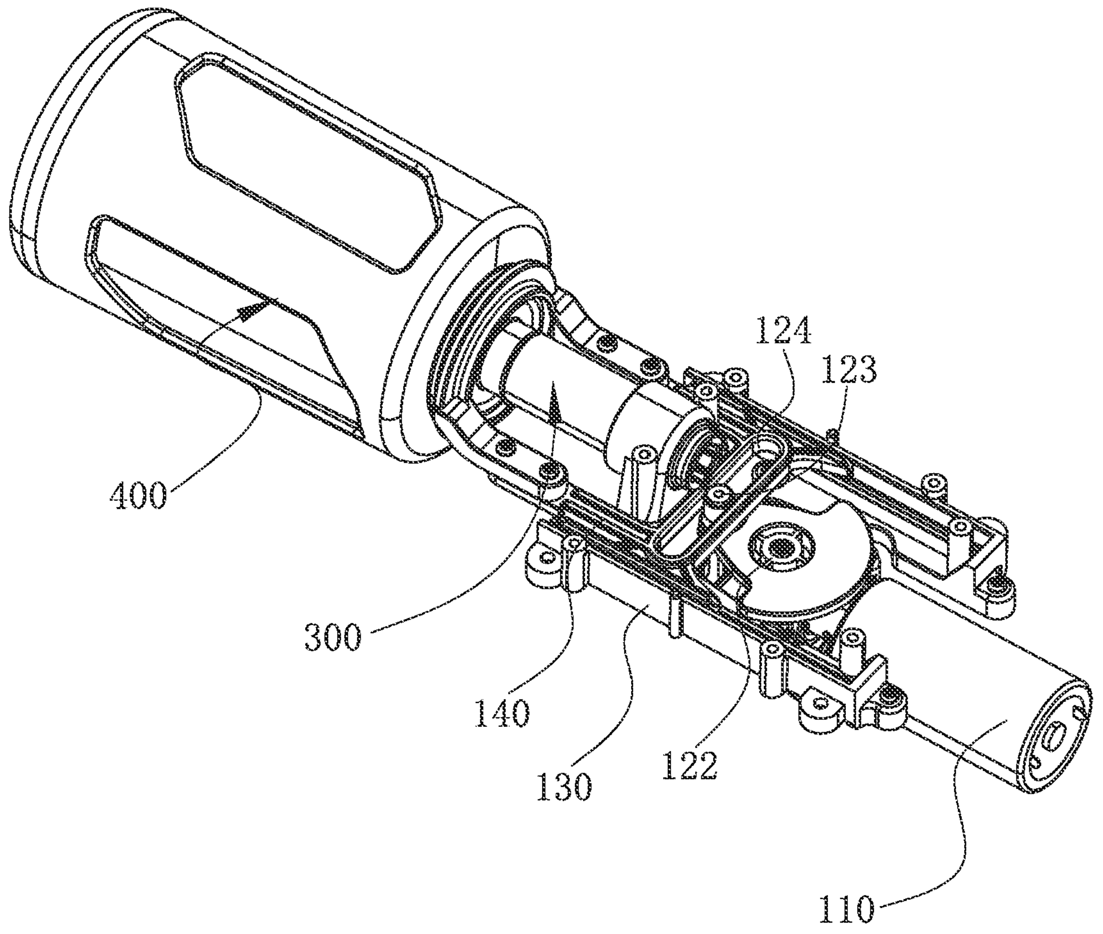
FIG. 4 is a structural diagram of a telescopic mechanism shown in FIG. 2.

Furthermore, regarding a specific structure of the telescopic drive component 120, as shown in FIG. 3, the telescopic drive component 120 includes a driving bevel gear 121 and a driven bevel gear 122 that mesh with each other; the driving bevel gear 121 is drive-connection with an output end of the telescopic drive motor 110, and the driven bevel gear 122 is provided with an eccentric shaft 123, the slider 140 is provided with a waist-round hole 142, and the eccentric shaft 123 is inserted into the waist-round hole 142.

Below, a working principle of the above-mentioned telescopic mechanism 100 will be explained:

- an output end of the telescopic drive motor 110 drives the driving bevel gear 121 to rotate, and the driving bevel gear 121 drives the meshed driven bevel gear 122 to rotate. With a cooperation of the eccentric shaft 123 and the waist-round hole 142, the driven bevel gear 122 drives the slider 140 to slide back and forth along the slide rail 130; grease can be applied between slider 140 and slide rail 130 to reduce a noise generated during sliding and improve a smoothness when sliding;
- the slider 140 that reciprocating slides then drives the telescopic rotating shaft 300 to extend and retract through the sleeve ring 141, and the telescopic rotating shaft 300 then drives the massage component 400 to perform a telescopic motion.

Figure 5:
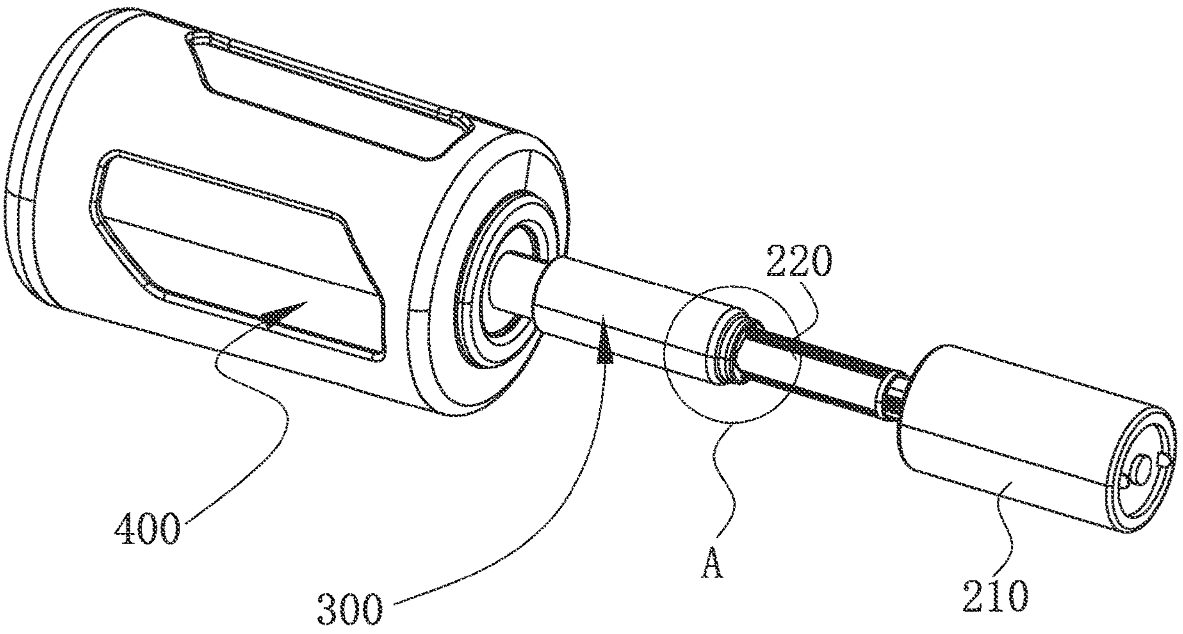
FIG. 5 is a structural diagram of a rotating mechanism shown in FIG. 2.

Below, a specific structure of the rotating mechanism 200 will be explained (please refer to FIGS. 3 and 5 together):

- the rotating mechanism 200 includes a rotatable drive motor 210 and a rotatable drive rod 220 that is drive-connection with an output end of the rotatable drive motor 210;
- the telescopic rotating shaft 300 can be reciprocally connected to the rotatable drive rod 220 along an axis direction, and the telescopic rotating shaft 300 cannot rotate relative to the rotatable drive rod 220.

There are the following implementation methods for a connection relationship between the telescopic rotating shaft 300 and the rotatable drive rod 220.

Embodiment 1

Figure 6:
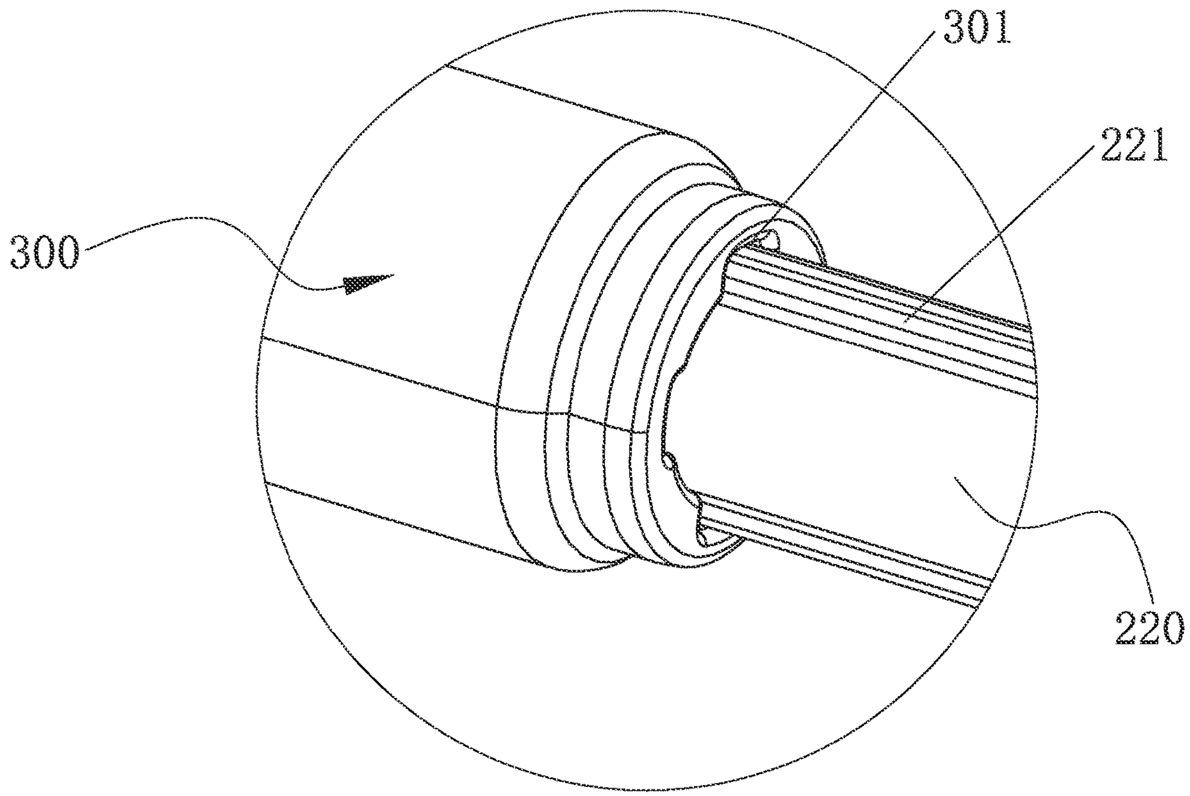
FIG. 6 is an enlarged view of FIG. 5 at position A.

As shown in FIG. 6, an outside wall of the rotatable drive rod 220 is provided with a limit rotation convex ridge 221 along the axis direction, and an inner side wall of the telescopic rotation shaft 300 is provided with a limit rotation groove 301 along the axis direction; the rotatable drive rod 220 is inserted into the telescopic rotating shaft 300, and the limit rotation convex ridge 2221 is located in the limit rotation groove 301. In this way, under an action of the limit rotation convex ridge 221 and the limit rotation groove 301, the telescopic rotating shaft 300 can be reciprocally connected to the rotatable drive rod 220 along the axis direction, while the telescopic rotating shaft 300 cannot rotate relative to the rotatable drive rod 220.

Embodiment 2

Referring to Embodiment 1, the limit rotation groove can be provided on an inner side wall of the rotatable drive rod 220, and the limit rotation convex ridge can be provided on an outside wall of the telescopic rotating shaft 300. This means that the positions of the limit rotation groove and the limit rotation convex ridge can be interchanged. However, by inserting the telescopic rotating shaft 300 into the rotatable drive rod 220, a connection between the telescopic rotating shaft 300 and the rotatable drive rod 220 can also be achieved; thus, the telescopic rotating shaft 300 can be reciprocally connected to the rotatable drive rod 220 along the axis direction, and the telescopic rotating shaft 300 cannot rotate relative to the rotatable drive rod 220.

Of course, the connection relationship between the telescopic rotating shaft 300 and the rotatable drive rod 220 is not limited to the two embodiments mentioned above. Other methods can also be used, as long as it can enable the telescopic rotating shaft 300 to be reciprocally connected to the rotatable drive rod 220 along the axis direction, and the telescopic rotating shaft 300 and the rotatable drive rod 220 cannot rotate relative to each other.

Below, a working principle of the above-mentioned rotating mechanism 200 will be explained:

an output end of the rotatable drive motor 210 drives the rotatable drive rod 220 to rotate, which in turn drives the telescopic rotating shaft 300 to rotate. The telescopic rotating shaft 300 in turn drives the massage component 400 to rotate.

It should be noted that through the analysis of the above structure, it can be seen that the telescopic mechanism 100 and the rotating mechanism 200 respectively drive the telescopic rotating shaft 300 to extend-and-retract and rotate. As the telescopic rotating shaft 300 can be reciprocally connected to the rotatable drive rod 220 along the axis direction, the telescopic rotating shaft 300 cannot rotate relative to the rotatable drive rod 220. Therefore, the massage component 400 can perform both telescopic and rotational motions without interference.

In the present disclosure, the slide rail 130 is provided with a support sleeve 131 (as shown in FIG. 3), and the telescopic rotating shaft 300 is retractably and rotatably sleeved on the support sleeve 131. It should be emphasized that an arrangement of the support sleeve 131 provides a stable support point for the telescopic and rotational motions of the telescopic rotating shaft 300, allowing the telescopic rotating shaft 300 to perform more stable telescopic and rotational motions.

As shown in FIG. 3, in the present disclosure, the male massager 10 with a telescopic rotating structure further includes a support seat 500. The support seat 500 has a motor holding portion 510 and a gear holding portion 520.

As shown in FIGS. 2 and 3, the telescopic drive motor 110 and the rotatable drive motor 210 are installed side by side in the motor holding portion 510, and an output shaft of the telescopic drive motor 110 and an output shaft of the rotatable drive motor 210 are parallel to each other and located on the same side. The driving bevel gear 121 and the driven bevel gear 122 are installed in the gear holding portion 520.

It should be particularly emphasized that, unlike a traditional structural design, in the present disclosure, an output shaft of the telescopic drive motor 110 and an output shaft of the rotatable drive motor 210 are parallel to each other and located on the same side (as shown in FIGS. 2 and 3), which can better integrate the telescopic drive motor 110 and the rotatable drive motor 210 in a narrow space and improve an integration of components. The telescopic drive motor 110 outputs power to the slider 140 through the driving bevel gear 121 and the driven bevel gear 122, thereby rendering the slider 140 to slide back and forth along the slide rail 130, achieving a transformation of the rotation power output into a final telescopic reciprocating motion.

Figure 7:
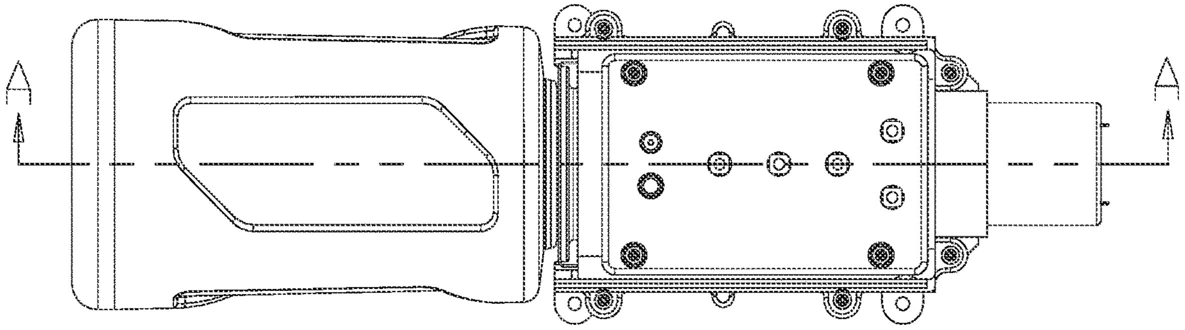
FIG. 7 is a plan view of the male massager with a telescopic rotating structure shown in FIG. 1.
Figure 8:
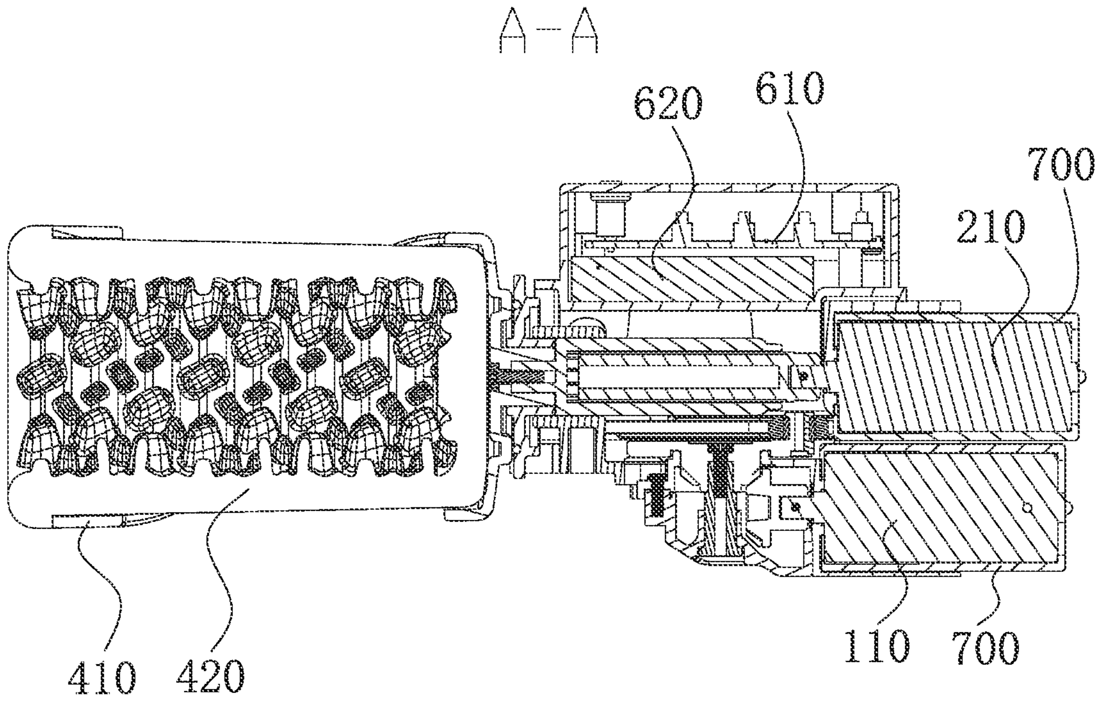
FIG. 8 is a cross-sectional view of FIG. 7 along A-A line.
Figure 9:
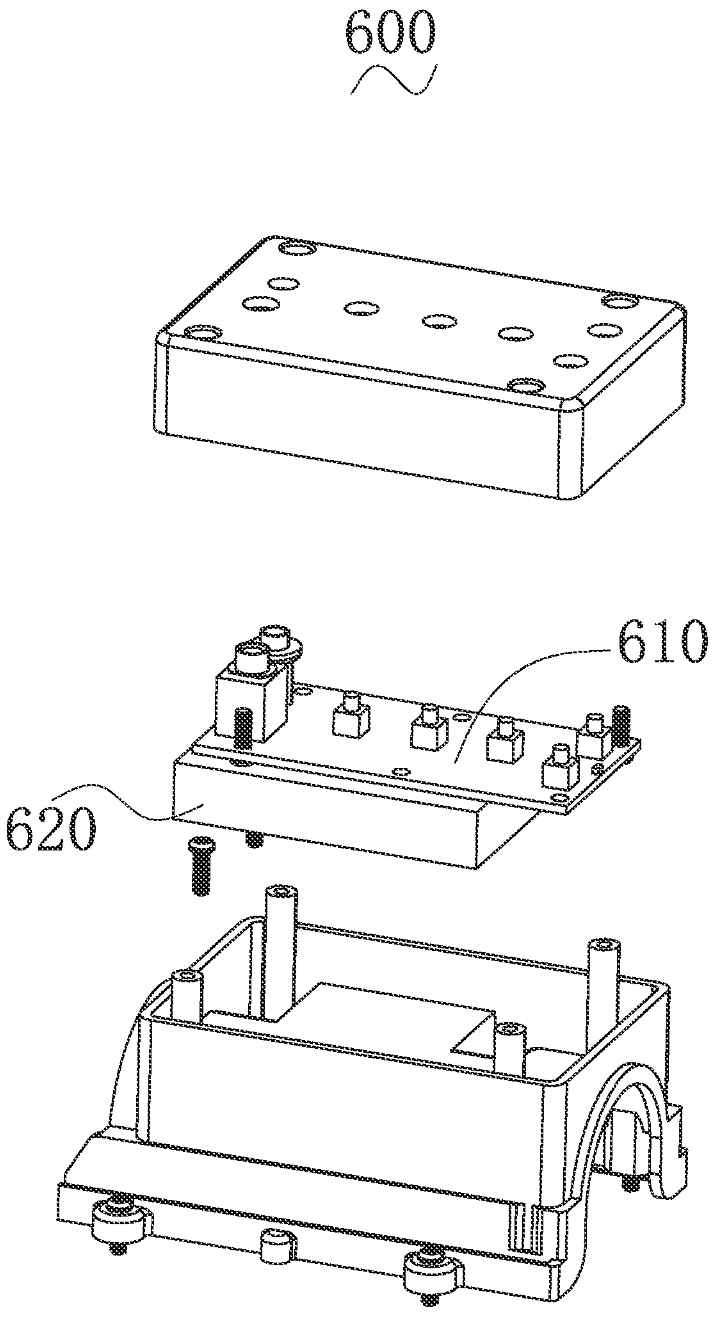
FIG. 9 is an exploded view of a control center shown in FIG. 1.

Please refer to FIGS. 7, 8, and 9 together. In the present disclosure, the male massager 10 with a telescopic rotating structure further includes a control center 600 having a circuit board 610 and a battery 620. The circuit board 610 controls the start and stop of the telescopic drive motor 110 and the rotatable drive motor 210, thereby achieving multiple mode control of the product. The battery 620 is used to provide power supply for the telescopic drive motor 110 and the rotatable drive motor 210.

As shown in FIG. 8, in the present disclosure, the massage component 400 includes an outer frame 410 and an inner liner 420 detachably connected to the outer frame 410. The inner liner 420 can be removed from the outer frame 410 for cleaning or replacement.

As shown in FIG. 8, in the present disclosure, an outside of the telescopic drive motor 110 and an outside of the rotatable drive motor 210 are provided with a wrapping sleeve 700. By wrapping the telescopic drive motor 110 and the rotatable drive motor 210 respectively with the wrapping sleeve 700, and then installing the telescopic drive motor 110 and the rotatable drive motor 210 with the wrapping sleeve 700 on the motor holding portion 510 of the support seat 500, a vibration noise generated by the telescopic drive motor 110 and the rotatable drive motor 210 during a working process can be effectively reduced, and a comfortable of product use can be improved.

The above embodiments only express several embodiments of the present disclosure, and their descriptions are more specific and detailed, but cannot be understood as limiting the scope of the disclosure patent. It should be pointed out that for ordinary technical personnel in this field, several deformations and improvements can be made without departing from the concept of the present disclosure, all of which fall within the protection scope of the present disclosure. Therefore, the scope of protection of the present disclosure should be based on the claims.

What is claimed is:

1. A male massager with a telescopic rotating structure, comprising: a telescopic mechanism, a rotating mechanism, a telescopic rotating shaft, and a massage component;

wherein, the telescopic mechanism drives the telescopic rotating shaft to extend and retract, and causes the massage component to perform a telescopic motion;

wherein, the rotating mechanism drives the telescopic rotating shaft to rotate and causes the massage component to perform a rotation motion;

wherein, the telescopic mechanism and the rotating mechanism respectively drive the telescopic rotating shaft to extend-and-retract and rotate, so that the massage component performs telescopic and rotational motions simultaneously;

wherein the telescopic mechanism comprises a telescopic drive motor, a telescopic drive component, a slide rail, and a slider;

the slider is provided on the slide rail in a reciprocating sliding manner, and the slider is provided with a sleeve ring, and the telescopic rotating shaft is rotatably sleeved on the sleeve ring;

the telescopic drive motor drives the slider to slide back and forth along the slide rail through the telescopic drive component, so that the sleeve ring drives the telescopic rotating shaft to extend and retract.

2. The male massager with a telescopic rotating structure according to claim 1, wherein, the telescopic drive component comprises a driving bevel gear and a driven bevel gear that mesh with each other;

the driving bevel gear is drive-connection with an output end of the telescopic drive motor, and the driven bevel gear is provided with an eccentric shaft, the slider is provided with a waist-round hole, and the eccentric shaft is inserted into the waist-round hole.

3. The male massager with a telescopic rotating structure according to claim 2, wherein, the rotating mechanism comprises a rotatable drive motor and a rotatable drive rod that is drive-connection with an output end of the rotatable drive motor;

the telescopic rotating shaft can be reciprocally connected to the rotatable drive rod along an axis direction, and the telescopic rotating shaft cannot rotate relative to the rotatable drive rod.

4. The male massager with a telescopic rotating structure according to claim 3, wherein, an outside wall of the rotatable drive rod is provided with a limit rotation convex ridge along the axis direction, and an inner side wall of the telescopic rotating shaft is provided with a limit rotation groove along the axis direction; the rotatable drive rod is inserted into the telescopic rotating shaft, and the limit rotation convex ridge is located in the limit rotation groove.

5. The male massager with a telescopic rotating structure according to claim 3, wherein, the slide rail is provided with a support sleeve, and the telescopic rotating shaft is retractably and rotatably sleeved on the support sleeve.

6. The male massager with a telescopic rotating structure according to claim 3, further comprising: a support seat; and the support seat has a motor holding portion and a gear holding portion;

the telescopic drive motor and the rotatable drive motor are installed side by side in the motor holding portion, and an output shaft of the telescopic drive motor and an output shaft of the rotatable drive motor are parallel to each other and located on the same side;

the driving bevel gear and the driven bevel gear are installed in the gear holding portion.

7. The male massager with a telescopic rotating structure according to claim 3, further comprising: a control center having a circuit board and a battery.

8. The male massager with a telescopic rotating structure according to claim 3, wherein, an outside of the telescopic drive motor and an outside of the rotatable drive motor are provided with a wrapping sleeve.

9. The male massager with a telescopic rotating structure according to claim 1, wherein, the massage component comprises an outer frame and an inner liner detachably connected to the outer frame.

* * * * *